United States Patent [19]

Pelt

[11] 4,217,929
[45] Aug. 19, 1980

[54] FLOW CONTROL COMPOSITE VALVE

[75] Inventor: Thomas E. Pelt, Milwaukee, Wis.

[73] Assignee: Badger Meter, Inc., Milwaukee, Wis.

[21] Appl. No.: 897,190

[22] Filed: Apr. 17, 1978

Related U.S. Application Data

[62] Division of Ser. No. 746,537, Dec. 1, 1976, Pat. No. 4,100,800.

[51] Int. Cl.² .................... F16K 15/03; G01F 7/00
[52] U.S. Cl. .................... 137/527.8; 73/197; 251/338
[58] Field of Search .................... 73/197; 137/527.8; 251/338

[56] References Cited

U.S. PATENT DOCUMENTS

| | | | |
|---|---|---|---|
| 1,128,657 | 2/1915 | Burton | 73/197 |
| 1,232,180 | 7/1917 | Barnes | 137/527.8 |
| 1,245,740 | 11/1917 | Krieg | 73/197 |
| 1,725,428 | 8/1929 | Tilden | 137/527.8 |
| 2,425,720 | 8/1947 | Bergman | 73/197 |
| 3,395,578 | 8/1968 | Simonds, Jr. | 73/197 |
| 3,720,229 | 3/1973 | Masson et al. | 137/527.8 |

*Primary Examiner*—William R. Cline
*Attorney, Agent, or Firm*—Neuman, Williams, Anderson & Olson

[57] ABSTRACT

A compound meter assembly is provided having primary and secondary passageways housing a high flow rate meter and a low flow rate meter, respectively. A composite flow responsive first valve is disposed within the secondary passageway and moves to a substantially closed position when the liquid flow through said passageway is increasing and exceeds a first predetermined rate. Upon substantial closing of the first valve, a substantial momentary pressure impulse is created and the liquid flow is diverted from the secondary passageway to the primary passageway. A composite pressure responsive second valve is disposed within the primary passageway and includes a gate member movable between open and closed positions, and a weighted operating member movable independently of the gate member and adapted to close the latter by pivotal movement and to lock the latter in a closed position by a wedging action until the momentary pressure impulse is created and exerted on the gate member and the liquid flow is diverted from the secondary passageway to the primary passageway. The composite first valve includes a first element, which moves to reduce the flow restriction therethrough as the second valve closes, and a cooperative second element to effect the aforementioned substantial closing of the secondary passageway.

13 Claims, 8 Drawing Figures

FLOW CONTROL COMPOSITE VALVE

This is a division of application Ser. No. 746,537, now U.S. Pat. No. 4,100,800, filed Dec. 1, 1976.

BACKGROUND OF THE INVENTION

This invention constitutes improvements in the Compound Meter Assembly as disclosed in copending application Ser. No. 746,536, filed Dec. 1, 1976 (now U.S. Pat. No. 4,100,799, issued July 18, 1978), of Allen C. Bradham, III and Edward A. Seruga.

Various meter assemblies of the type frequently referred to as compound meters have heretofore been provided for measuring variable flow rates within a piping system. Such assemblies, however, because of certain structural characteristics have been beset with one or more of the following shortcomings: the assembly is incapable of accurately measuring the flow rate where the latter varies over a wide range; the assembly is of bulky, costly and complex construction; the flow paths through the assembly are such that substantial pressure drops occur within the assembly; the assembly is susceptible to harmonic oscillation or chattering when measuring the liquid flow; and servicing of the assembly is a difficult and awkward operation requiring shut down of the assembly for inordinate periods of time and oftentimes requiring removal of the entire assembly from the piping system.

The aforementioned application Ser. No. 746,536 discloses a new compound meter assembly which substantially overcomes the above-noted problems. The instant invention, however, is directed to further improvements in such assemblies, and particularly to improving the closing and sealing action of valves, such as the valve disposed in the primary passageway, and to providing an improved trigger valve arrangement for controlling the closing as well as the opening of the primary passageway valve.

SUMMARY OF THE INVENTION

It is an object of this invention to provide improved flow control assemblies.

It is a specific object of this invention to provide an improved compound meter capable of accurately measuring fluid flow over a wide range of flow rates.

It is a further object of this invention to provide improved automatically-operating valve assemblies having different opening and closing operational parameters.

It is a still further object of this invention to provide improved trigger valve assemblies for automatically and accurately controlling the closing as well as the opening of other flow valves, such as the primary flow valves, embodied in compound meters.

Further and additional objects will appear from the description, accompanying drawings and appended claims.

In accordance with one embodiment of the invention a compound meter assembly is provided having primary and secondary passageways housing a high flow rate meter and a low flow rate meter, respectively. A composite flow responsive first valve is disposed within the secondary passageway and is adapted to move from a normally open position to substantially closed position when the liquid flow through said passageway is increasing and exceeds a first predetermined rate. Upon the first valve assuming said substantially closed position, a momentary high pressure pulse is created and the liquid flow is diverted from the secondary passageway to the primary passageway. A composite second valve is disposed within the primary passageway and includes a gate member movable between open and closed positions, and a weighted operating member movable independently of the gate member and adapted to close the latter by pivotal movement and to lock the latter in a closed position by a wedging action until the pressure pulse is exerted on the gate member causing same to be released from said closed position and the liquid flow is substantially diverted from the secondary passageway and causes said gate member and said weighted member to simultaneously move to a fully open position. The composite first valve includes a first element which in its open, or down, position produces a predetermined restriction to the liquid flow through the secondary passageway, and when in its up position, produces a lesser restriction to the liquid flow. The valve first element moves to its up position when the liquid flow exceeds a predetermined first flow rate. The first valve also includes a cooperative second element which normally assumes an open, or down, position and is adapted to move to an up position when the liquid flow exceeds a predetermined second flow rate. When the second element of the first valve is in the up position, flow through the secondary passageway is substantially closed off producing a momentary high pressure impulse which is transmitted to the second valve opening same and thereby causing the liquid flow to be diverted from the secondary passageway to the primary passageway.

For a more complete understanding of the invention reference should be made to the drawings, wherein.

Figure 1:
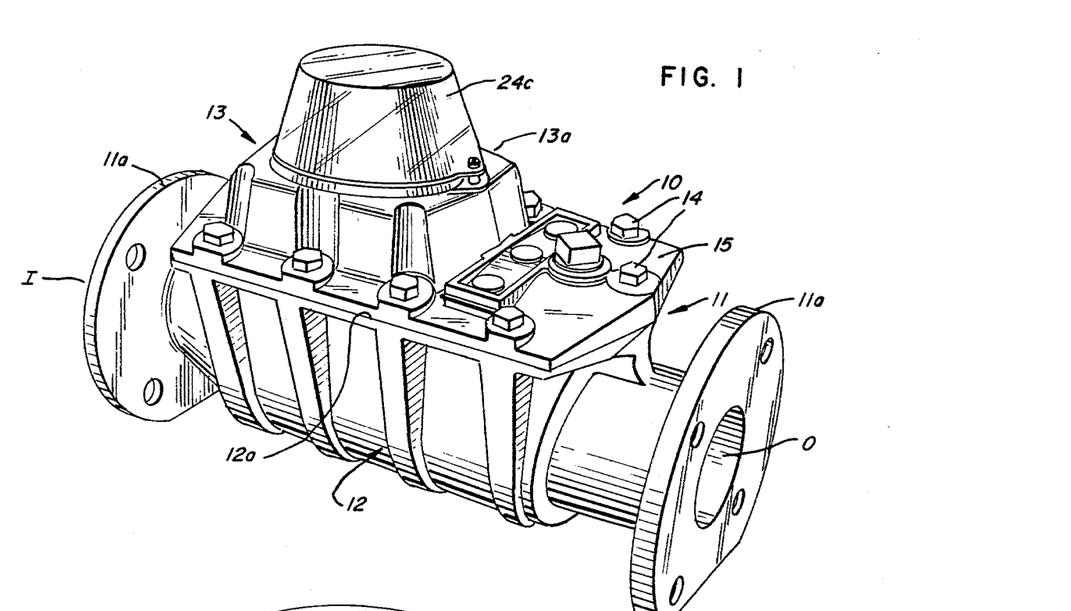
FIG. 1 is a perspective top view of one form of an improved meter assembly employing teachings of this invention.
Figure 2:
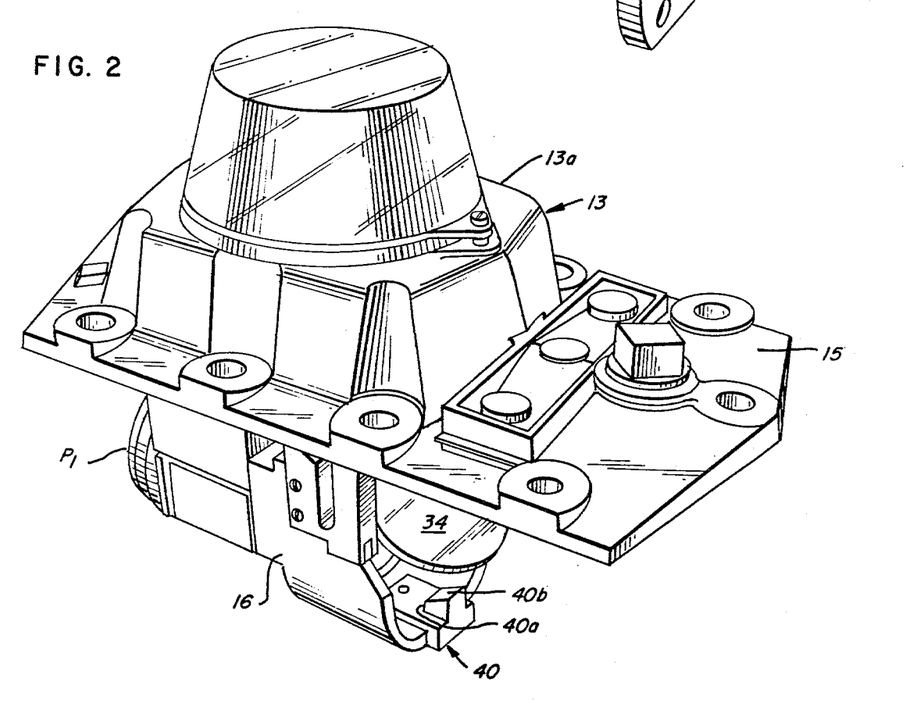
FIG. 2 is an enlarged perspective view of the metering section of the assembly of FIG. 1 subsequent to the section having been removed from a complemental housing section which normally remains in place with the piping system.
Figure 3:
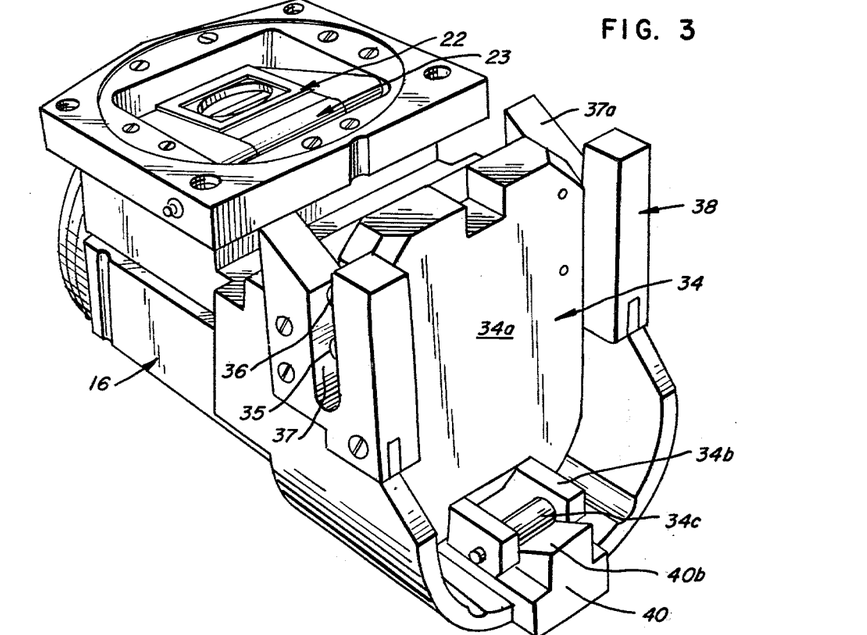
FIG. 3 is an enlarged fragmentary perspective view of a portion of the metering section of FIG. 2, i.e., with the data reading means, low flow rate meter, cover plate and partition removed therefrom and with the valve of the primary passageway shown in its closed position and the valve of the secondary passageway shown in its open position.
Figure 4:
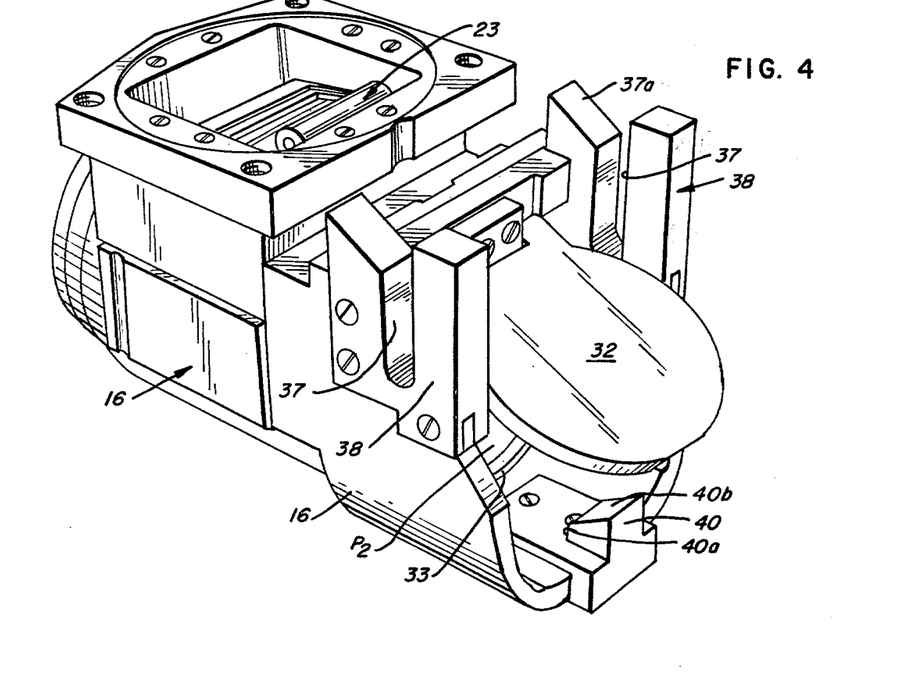
FIG. 4 is similar to FIG. 3 but showing the gate member of the primary passageway valve in an open position and with the weighted operating member for the gate member and one component of the secondary passageway valve removed.

Referring now to the drawings and more particularly to FIGS. 1 and 2, one form of an improved meter assembly 10 is shown prior to being installed in a piping system, not illustrated. The assembly is adapted to utilize two meters, each of which may be of a conventional type, to accurately measure the liquid flow in the piping system which may vary over a wide range of flow rates. The assembly includes a housing 11 comprising a first section 12 and a complemental second or metering section 13 which is removably secured thereto by a plurality of suitable fasteners 14. Housing section 12 is provided with an inlet I and an outlet O which are normally connected to corresponding portions of the piping system. The inlet and outlet are delimited by annular collars or flanges 11a which facilitate connection to the piping system. The particular embodiment illustrated and described below is designed for use in a 3" diameter piping system, and also is suitable for use in a 2" system by variation of the outer housing to provide connecting flanges suitable to the 2" system. Of course, a wide variety of sizes of corresponding units may be provided for other piping systems.

Housing section 12 normally remains in place within the piping system. Section 13, as seen in FIG. 2, is provided with a cover portion 15 which is sized so as to completely overlie and close-off the upper open side 12a of section 12 when the sections are in assembled relation, see FIG. 1. Depending from the cover portion 15 is an integral metering assembly including a carriage 16 in which are formed primary and secondary passageways P and S, respectively, as will be observed in FIG. 5. The primary passageway has a substantially rectilinear elongated configuration which is in substantial alignment with the inlet and outlet. Thus, liquid flow through the primary passageway is substantially straight-line, thereby resulting in a minimum pressure drop when there is full flow through the primary passageway.

When sections 12 and 13 are in assembled relation the upstream end $P_1$ of the primary passageway is aligned with the inlet I, formed in housing section 12. The exterior of the carriage 16 defining passageway end $P_1$ is in sealing contact with a complemental portion of the interior of housing section 12 as at an annular O-ring 16a, see FIG. 5.

The inlet end of the secondary passageway S communicates with primary passageway P at juncture J which is disposed downstream of inlet I of housing section 12. The secondary passageway is nonrectilinear and comprises a first cavity 17 spaced above the juncture J, a second cavity 18 disposed above cavity 17 and separated therefrom by a partition 20, and a port 25 between cavity 18 and an upper interior portion 19 of the housing 13. Portion 19 communicates with the portion 12b which is disposed adjacent outlet O. Partition 20 is provided with an opening 20a which communicates with the two cavities.

Flow from cavity 17 to cavity 18 through opening 20a is controlled by a composite valve 21, sometimes referred to as a trigger valve. Valve 21 includes a hingedly mounted first member 22 having an aperture 22a formed therein which is smaller in size than opening 20a and is in registration therewith when member 22 is moved to an up or substantially closed position, as in FIG. 6. When member 22 is in the up position, it subtends and is in contact with the portion of the partition 20 circumjacent the opening 20a. Valve 21 also includes a weighted imperforate member 23 which is hingedly mounted about the same axis as member 22 but is movable independently thereof. The hinge axis for members 22, 23 is substantially horizontal. Member 22 rests against member 23 when both members are in their normal down or open position, see FIG. 5, whereby member 23 closes the aperture 22a. The member 23 also substantially closes the aperture 22a when both members are in the up or closed position, shown in full lines in FIG. 6.

Figure 5:
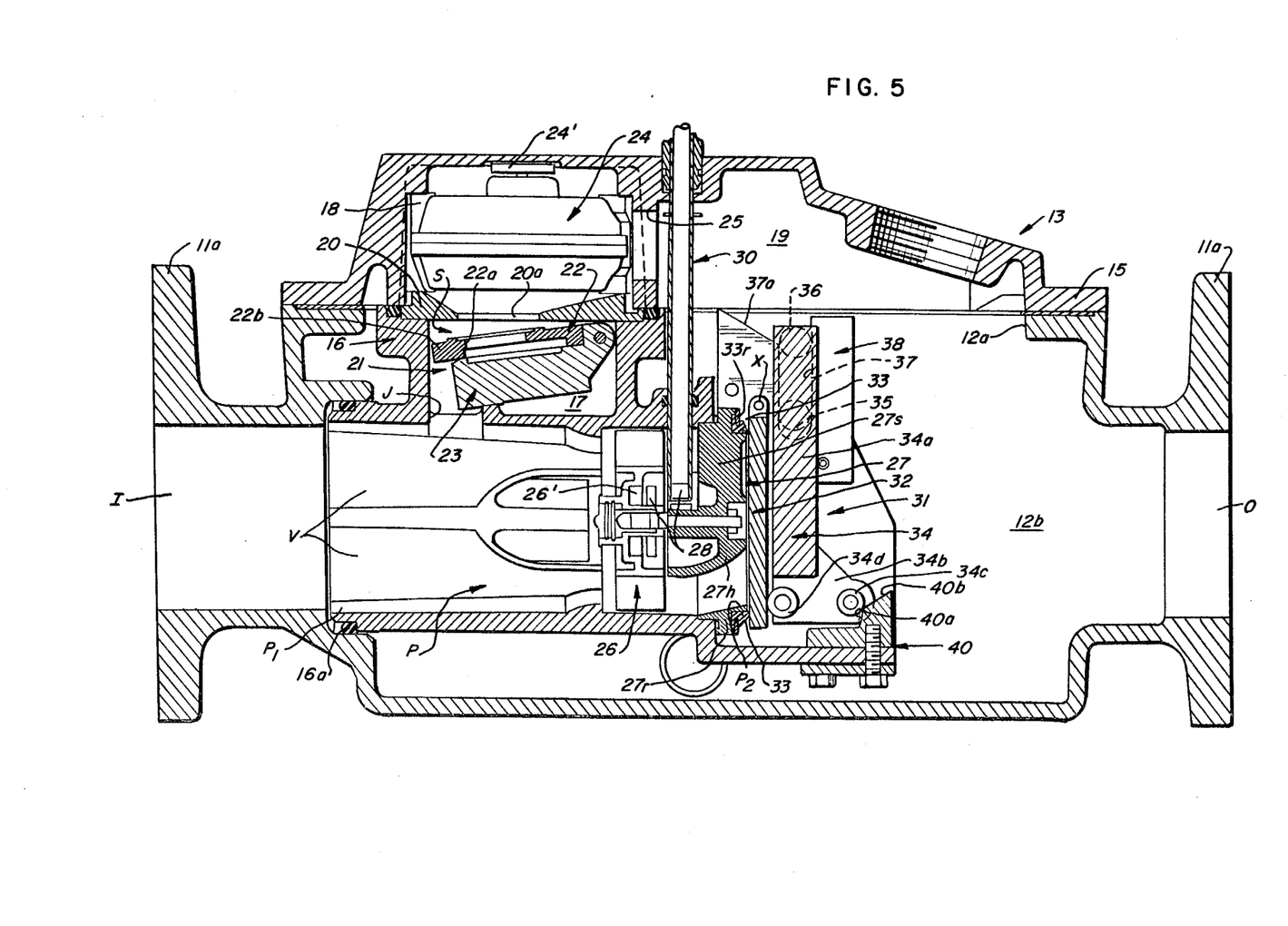
FIG. 5 is an enlarged, fragmentary vertical sectional view of the assembly of FIG. 1 taken along substantially the flow axis through the primary passageway and showing the primary passageway valve thereof in a fully closed position and both components of the valve in the secondary passageway in open positions; the data reading means is not shown.

The member 22 has a lateral dimension relative to the lateral dimensions of cavity 17 such that there is a restriction to flow of fluid through the cavity 17 around or past member 22 even though the member 22 is in its open position, see FIG. 5. Such flow restriction is greater than the restriction to flow through the aperture 22a when the member 22 is in its up or substantially closed position relative to partition 20, as will be referred to further below. Valve member 23 is of a lesser lateral extent and of greater weight than member 22. Because of the lesser extent and greater weight of member 23, higher flow rate through passageway S is required in order to pivot member 23 to an up position wherein it subtends and contacts the previously up positioned member 22 than is required to move member 22 to its up position. Once member 23 has assumed its up position, see FIG. 6, liquid flow through the secondary passageway S is most restricted so long as the member 23 remains in its up position. Both members will move to their down, or open, positions after the valve 31 opens, as described further below. A small liquid flow through or around member 23 exists, when both members 22, 23 are in their up positions so as to prevent sediment accumulation and related sticking of the components of the meter 24 disposed within cavity 18.

Meter 24, located in a fixed position within cavity 18, is preferably a conventional nutating disc-type similar to that disclosed in U.S. Pat. No. 3,248,583. Meter 24 is a positive displacement meter and is particularly suitable for accurately measuring low rates of liquid flow (e.g., below approximately 17 g.p.m.). Once the liquid has flowed through meter 24, it leaves cavity 18 through the opening 25 and into interior portion 19 of section 13 and portion 12b of section 12 before exiting through outlet O, see FIG. 5. The metering movement of the disc, not shown, of meter 24, which is responsive to the liquid flow through the secondary passageway S, is transmitted to data reading mechanism such as a totalizer register which is disposed beneath a transparent cover 24c (FIG. 1) by means of a magnetic coupling 24'.

Figure 6:
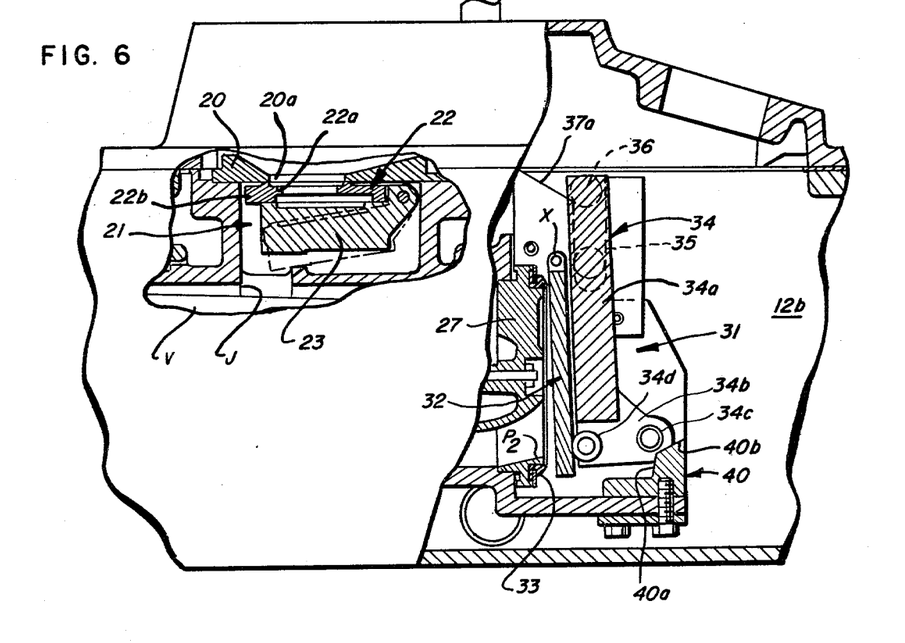
FIG. 6 is an enlarged, fragmentary side elevational view partially in vertical section of the metering section showing the first valve substantially closed and the primary passageway valve just after the momentary high pressure impulse has been exerted on the gate member causing the latter to be released from its fully closed position.

When members 22 and 23 of valve 21 are pivoted to their up positions relative to opening 20a, see FIG. 6, the liquid flow through the assembly 10 is substantially diverted momentarily from the secondary passageway S to the primary passageway P thereby causing a substantial pressure impulse to be created on the upstream side of valve 31.

Disposed coaxially within primary passageway P and downstream from juncture J is a conventional, turbine type meter 26, which is capable of accurately measuring high liquid flow rates over a wide range. This meter may be of a conventional axial flow turbine type, of which one recent improved example is disclosed in U.S. Pat. No. 3,972,233. The meter is retained in position within the passageway by a suitable stationary retainer 27 comprising a hub 27h supported by struts 27s on a mounting ring 27r. The rotational movement of a flow responsive turbine impeller 26', which comprises a component of meter 26, is imparted by means of a magnetic coupling 28 to an upright or transversely extending shaft 30 which is adapted to be rotated about its longitudinal axis. The lower end of shaft 30 is supported by a bearing in retainer 27 while the upper end thereof terminates with a drive connection to the aforementioned data reading mechanism mounted on the upper portion 13a of the housing section 13, see FIG. 2. The upper or distal end of shaft 30 is connected by a gear train, not shown, to a suitable gauge and an odometer counter, which summarizes the readings of meters 24 and 26. The gauge and counter are not shown but comprise components of the data reading mechanism.

In order to provide a more accurate measurement by meter 26 of the liquid flow through passageway P, flow straightening vanes V may be located within the passageway, upstream of the meter 26. The vanes are symmetrically arranged within the passageway P and extend radially inwardly from the wall of said passageway.

Disposed downstream of meter 26 is a pressure responsive, composite valve 31. The valve 31 normally assumes a closed position, see FIG. 5, under low flow rate conditions while the liquid flow is through the secondary passageway S. Valve 31 includes a lightweight gate member 32, preferably formed of a plastic material which is inert to the flowing liquid. The upper portion of the gate member is connected so as to pivot about a fixed horizontal axis X which is offset from the discharge end P₂ of the primary passageway P. When gate member 32 is in its closed position, it sealingly engages an annular lip-type seal 33 which delimits the discharge end P₂ of passageway P and is held in place by a retainer ring 33r, see FIGS. 5 and 8.

Valve 31 also includes a weighted member 34, which is disposed on the downstream side of gate member 32 and is in engagement therewith when the gate member 32 is in sealing contact with seal 33. Member 34 includes a plate section 34a, a transversely disposed extension 34b formed on the lower edge of section 34a, a follower roller 34c carried by the extension 34b and positioned downstream of the plate section 34a, and a second roller 34d spaced forwardly of roller 34c and being adapted to engage the downstream surface of gate member 32 and retain the latter in its closed position. Mounted on the upper portion of plate section 34a and extending laterally from opposite sides thereof are pairs of guide rollers 35 and 36.

The guide rollers 35 and 36 on each side of plate section 34a are disposed within an upwardly extending slot 37 formed in an adjacent stationary guide 38. As seen in FIG. 5, one side of the slot 37, adjacent the upper end thereof, is angularly disposed and forms a ramp-like surface 37a. The upper guide roller 36 engages on surface 37a for pivotally supporting the member 34 when that member is in an open position, as seen in FIGS. 6 and 7.

Disposed downstream from member 34 and aligned with extension 34b thereof, when the member 34 is in its closed position, is a stationary member 40 secured to carriage 16. The upstream and upper surfaces of member 40 form, respectively, a first cam segment 40a which is steeply inclined (e.g., approximately 8° to the vertical), and a second cam segment 40b which extends downstream and upwardly at a more gradual angle (e.g., approximately 35° from the horizontal) from the upper edge of segment 40a.

Figures 7, 8:
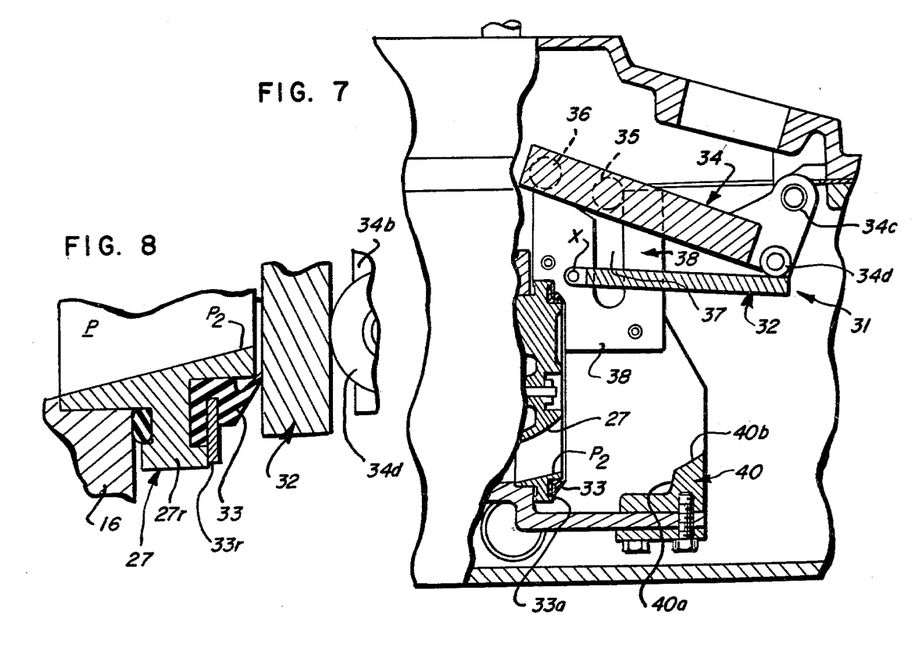
FIG. 7 corresponds to a portion of FIG. 6 but showing both components of the primary passageway valve in fully opened positions.
FIG. 8 is an enlarged, fragmentary vertical sectional view showing the gate member in a sealed, closed relation with respect to the downstream end of the primary passageway.

When the weighted member 34 is moving to a closed position from its fully opened position, FIG. 7, the member 34 will pivot in a clockwise direction about rollers 36 as an axis. However, simultaneously with the pivoting movement of the member 34 about rollers 36, the latter are moving downwardly along ramp-like surface 37a as rollers 35 move downwardly along slots 37. Upon the rollers 36 reaching the lower ends of surfaces 37a, roller 34c carried by the extension 34b of member 34 will contact member 40 at the upper edge of cam segment 40a. Roller 34c thereafter moves along the steeply inclined cam surface 40a as the member 34 drops by gravity, and the rollers 34c and 34d will be wedged between the downstream side of gate member 32 and the cam segment 40a of stationary member 40 to force gate 32 against the seal 33. To release rollers 34c and 34d from their wedged position requires the substantial pressure impulse to be applied to the upstream side of the closed gate member whereby the upwardly directed vector of the resulting applied force at cam segment 40a will be such as to overcome the weight of member 34 and any friction existing at the rollers 34c and 34d.

It should be noted that as roller 34c engages and moves downwardly along cam segment 40a during closing, a closure force is applied to gate member 32 via roller 34d and the gate member moves compressibly against seal 33 about pivot X without any sliding action. Conversely, upon opening, the upstream face of gate member 32 will move away from seal 33 without causing a sliding action to occur between the gate member and the seal. By avoiding such sliding action, unpredictable friction forces are avoided during the seating and unlocking movements. A simplified and efficacious sealing arrangement is obtained while retaining the basic dual modes of closing and opening actions by force of gravity as in the apparatus of the aforementioned application Ser. No. 746,536. Moreover, the wear life of the seal 33 is significantly extended thereby reducing maintenance costs and the like.

During opening of valve 31, once roller 34c has reached the top of cam segment 40a (FIG. 6), the rollers 36 will re-engage the surfaces 37a and the force of the diverted flowing liquid will cause the gate member 32 and weighted member 34 to pivotally move as a unit toward the fully opened position, as seen in FIG. 7. The valve 31 will remain open in its pivotal mode so long as the liquid flow within the primary passageway remains above a predetermined level (e.g., 7 g.p.m. for the described embodiment). When the flow diminishes to this predetermined level, the valve member 34 will have returned to a position in which rollers 36 pass off of ramps 37a and roller 34b is over the upper edge of ramp 40a. At this point member 34 drops by gravity into its wedging mode locking gate member 32 in its fully closed position against seal 33 as noted above.

The overall operation of the described meter is similar to the meter described in the aforementioned application Ser. No. 746,536, but with improved closure action and seating of the primary valve as noted above and improved control over the closing point of the primary valve by the composite trigger valve 21.

By way of further illustration, the operation of this improved embodiment will be described assuming an initial condition of no flow or very low flow in which both valve members 22 and 23 are in their down positions and valve 31 is fully closed, as in FIG. 5. As the flow rate increases and exceeds a first predetermined amount (e.g., approximately 7–10 g.p.m.), member 22 will move (clockwise as seen in FIG. 6) to its up or substantially closed position. Until the liquid flow through the secondary passageway S has increased to a second predetermined rate (e.g., approximately 17 g.p.m.) the weighted member 23 will remain in its open or down position as seen in FIG. 5. Independent movement of member 22 to its closed position is due to the flowing liquid engaging the portion 22b of the member which protrudes beyond the periphery of member 23, as seen more clearly in FIG. 5 and the pressure drop thereacross. This closure of member 22 during crossover-up (i.e., during increasing flow) provides a reduction of pressure across valve 31 which, however, is insufficient to cause the latter to move from its closed position.

When the flow rate reaches the second predetermined rate, member 23 moves to its up position thereby causing substantial flow through the meter to be momentarily interrupted and a sudden substantial pressure drop to be created between inlet I and outlet O producing a pressure impulse of high magnitude. The pressure impulse is momentarily exerted on the upstream surface of gate member 32 whereby a resultant upward force component is imparted at the steep angled interface of roller 34c and cam segment 40a which will be sufficient to release member 34 from its wedged position (see FIG. 6). Once member 34 has been released from its wedged position, closure plate 32 will react to the diverted liquid flow and move to its fully open position (see FIG. 7) by pivoting about axis X and by movement of member 34 about rollers 36. When valve 31 opens, thereby establishing flow through the primary passage and through meter 26, there is a prompt drop in pressure loss across the assembly notwithstanding that the flow rate continues to increase. With this drop, valve member 22 and 23 return to their normal open or down positions. Thereafter flow continues through both meters 24 and 26. However, the rate of flow is more than adequate to insure that the meter 24 will start promptly and will be operating within its range of acceptable accuracy of flow measurement. It is not until the flow rate through the assembly exceeds approximately 150 g.p.m. that there is once again any appreciable pressure loss across the assembly. In this high flow area of operation the valve members 22 and 23 again will move to their up positions and prevent any overspeed operation of the meter 24 as the pressure drop increases.

As the flow through the meter assembly 10 diminishes, valve members 22 and 23 will open below the high flow cut-off, e.g., 150 g.p.m., and thereafter will remain open, and valve member 34 will move plate 32 toward its closed position. The valve member 22 automatically will move off of member 23 and return to its up or closed position at a first predetermined flow rate through the meter, e.g., approximately 7 g.p.m., while member 23 remains open. When member 22 is in up position and member 23 is in its down position, aperture 22a is exposed and thus permits the flow through the secondary passage to pass through the aperture 22a. This reduces slightly the restriction to flow through the secondary passageway S and, thus, causes a small but abrupt decrease in the pressure drop across valve 31 just as the latter valve is about to close. Valve member 34 thereupon promptly moves by gravity to its closure and wedge locking position as described above. The action of the member 22 provides control over the flow rate at which closure of valve 31 will occur and, thus, the point of crossover-down in shutting down the use of the high flow rate meter 26. This closure action also assures positive closure of the primary valve and avoids leakage flow through the primary passageway.

The rate of flow at which member 22 moves to its up position and thereby the rate at which member 34 closes is well below the flow rate which would otherwise cause member 23 to reclose. Accordingly, member 23 will maintain its open position during this downward crossover of metering operations, and valve 31 will not reopen until such time as the flow rate again reaches the higher flow rate for crossover under increasing flow rate conditions. Thus, the opening conditions are significantly different (higher flow rate and pressure drop) than the closing conditions. Because valve member 34 opens only when the flow through the assembly has increased to a significantly higher flow (e.g., approximately 17 g.p.m.) and then resumes its closed position when the flow through the assembly has diminished to a lower flow (e.g., approximately 7 g.p.m.) thereby avoiding the annoying problem of valve oscillation or "chatter" commonly associated with prior apparatus. Moreover, all the benefits of dual metering and attendant accuracy over wide ranges of flow rates are maintained or improved.

By having the gate member 32 separate from weighted member 34, an improved seating and sealing action is obtained. Also, the gate member 32 may be readily formed of an inexpensive material and be replaced when desired. Thus, the cost of maintenance and replacement of the gate member is significantly reduced. As aforementioned, because gate member 32 engages and disengages the seal 33 by a pivotal movement rather than a sliding motion, there is no sliding friction created during the wedge locking and unlocking movements.

The trigger valve 21 may be utilized to control the operation of other types of valves, including but not limited to the primary passageway valve as shown in the aforementioned application. Similarly, the composite primary passageway valve may also be utilized in other installations.

A small opening, not shown, may be provided in member 23 to maintain a flushing flow through the meter 24 when both memebers 22 and 23 are in their up positions with respect to partition 20.

It is to be understood, of course, that other modifications and/or improvements may be incorporated, and the size and configuration and the relative location of the various components comprising the meter assembly may be varied from that shown without departing from the scope of the invention.

While a particular embodiment of this invention has been shown, it will be understood, of course, that the invention is not limited thereto since many modifications may be made by those skilled in the art, particularly in light of the foregoing teachings. Therefore, it is contemplated by the appended claims to cover any such modifications as incorporate those features which may be said to constitute the essential features of these improvements within the true spirit and scope of the invention.

What is claimed is:

1. A flow control assembly including a composite valve responsive to liquid flow and to gravity, said composite valve comprising: a valve seat circumscribing an outlet passage and oriented to face downstream; a closure member mounted within said assembly on the downstream side of said seat and movable towards and away from said seat for engagement therewith to close and open said outlet passage in response to pressure differentials across said closure member; stationary means mounted within said assembly downstream from said closure member; a weighted member disposed within said assembly downstream from said closure member, said weighted member being separate from said stationary means and said closure member; and means mounting said weighted member for movement by gravity against said closure member to urge said closure member toward said seat against liquid flow through said outlet passage, said mounting means permitting generally downward wedging movement of said weighted member by gravity into wedging engagement between said closure member and said stationary means as said closure member engages said seat to hold said closure member against said seat by such wedging engagement.

2. The flow control assembly of claim 1 wherein said closure member is hingedly mounted above said valve seat for such movement relative to said valve seat.

3. The flow control assembly of claim 2 wherein said weighted member is substantially pivotally supported when disengaged from said stationary member.

4. The flow control assembly of claim 1 wherein said weighted member is disengaged from said stationary member when said closure member is disengaged from said valve seat, and wherein said "mounting" means provides pivotal support for said weighted member when the latter is disengaged from said stationary member.

5. The flow control assembly of claim 4 wherein said "mounting" means provides such pivotal support of said weighted member above said outlet passage and permits generally vertical sliding movement of said weighted member when the latter is engaging said stationary member and said closure member in the valve closing position.

6. The flow control assembly of claim 1, 2, 3, 4 or 5 including means for rolling engagement between said weighted member and said closure member.

7. The flow control assembly of claim 1 including means for supporting said weighted member when said closure member is disengaged from said valve seat.

8. A composite valve responsive to fluid flow and to gravity comprising: a housing having an inlet and an outlet; a valve seat circumscribing a fluid flow passage within said housing between said inlet and said outlet and facing downstream; a closure member pivotally mounted above said valve seat for movement into and out of engaagement therewith in response to pressure differentials across said closure member; stationary means mounted downstream from said closure member; a weighted member mounted downstream from said valve seat, said weighted member being separate from said stationary means and said closure member; and means supporting said weighted member for movement by gravity against said closure member to urge said closure member toward said seat against fluid flow through said outlet passage during a portion of its movement and permitting said weighted member to undergo free vertical motion by gravity into wedging engagement between said stationary means and said closure member as said closure member engages said seat to hold said closure member against said seat by such wedging engagement.

9. The composite valve assembly of claim 8 wherein said means for supporting said weighted member includes a first generally U-shaped bracket with first and second upstanding legs, said first leg having a beveled edge and being upstream from said second leg, said weighted member including a support element engaged between said legs for vertical movement therebetween and lateral movement on said beveled edge for permitting vertical and rotational movement of said weighted member.

10. The composite valve assembly of claim 8 wherein said weighted member includes means for rolling engagement with said closure means.

11. The composite valve assembly of claim 8 wherein said stationary means includes at least one cam surface facing upstream for engagement by said weighted member during such wedging engagement thereof between said stationary means and said closure member.

12. The composite valve assembly of claim 8, 9, 10 or 11 wherein said weighted member includes means for rolling engagement with said stationary means and means for rolling engagement with said means for supporting said weighted member.

13. The composite valve assembly of claim 8 wherein said means for supporting said weighted member includes a pair of generally U-shaped brackets with first and second upstanding legs, said first leg having a beveled edge and being upstream from said second leg, said weighted member including a support element engaged between said legs for vertical movement therebetween and lateral movement over said beveled edge for permitting vertical and rotational movement of said weighted member.

* * * * *

UNITED STATES PATENT AND TRADEMARK OFFICE
CERTIFICATE OF CORRECTION

PATENT NO. : 4,217,929
DATED : August 19, 1980
INVENTOR(S) : Thomas E. Pelt

It is certified that error appears in the above-identified patent and that said Letters Patent are hereby corrected as shown below:

Column 9, line 34 (Claim 4), remove quotes from "mounting".
Column 9, line 39 (Claim 5), remove quotes from "mounting".

Signed and Sealed this

Tenth Day of March 1981

[SEAL]

Attest:

RENE D. TEGTMEYER

Attesting Officer     Acting Commissioner of Patents and Trademarks